Jan. 24, 1956  M. W. ABBERLEY  2,732,214

POTTERS' LATHES AND CHUCKS

Filed Nov. 30, 1951

Inventor
Maurice W. Abberley
By

United States Patent Office 2,732,214
Patented Jan. 24, 1956

2,732,214

POTTERS' LATHES AND CHUCKS

Maurice W. Abberley, Stoke-on-Trent, England

Application November 30, 1951, Serial No. 259,068

3 Claims. (Cl. 279—3)

This invention relates to potters' lathes and chucks.

The invention is a development from that set forth in U. S. A. Patent No. 2,529,331 in which chucks are set forth for articles having one end substantially closed and the other end open, and comprising means for forming an air seal within the article and means for exhausting the closed cavity thereby obtained.

The object of the present invention is to provide improved means for locating and supporting the article on the chuck, so that notwithstanding the fact that the article may be of the utmost fragility it will be properly supported while being acted upon.

The invention is intended especially for use in connection with a lathe as set forth in the specification of U. S. A. Patent No. 2,586,628, and although it is not intended to confine the present invention to use in conjunction with lathes on those lines nevertheless it is felt that the best results will probably be attained when the two are used in conjunction with each other.

The invention will be described with reference to the accompanying drawings, in which.

Figure 1:
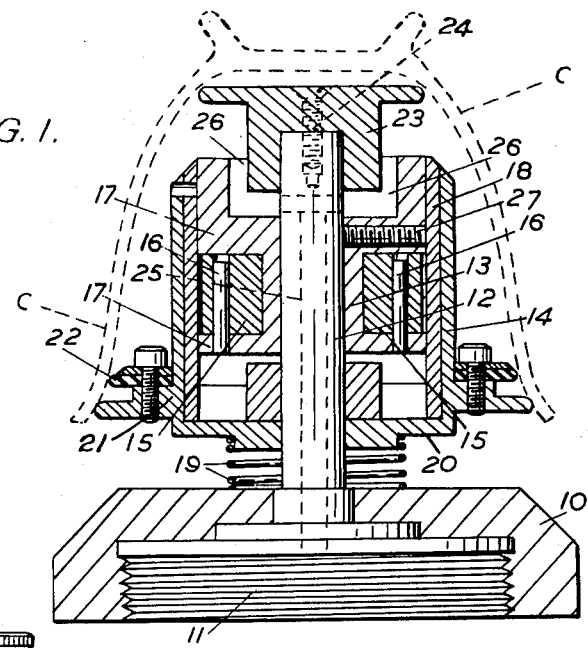
Figure 1 is a sectional elevation of a chuck.
Figure 2:
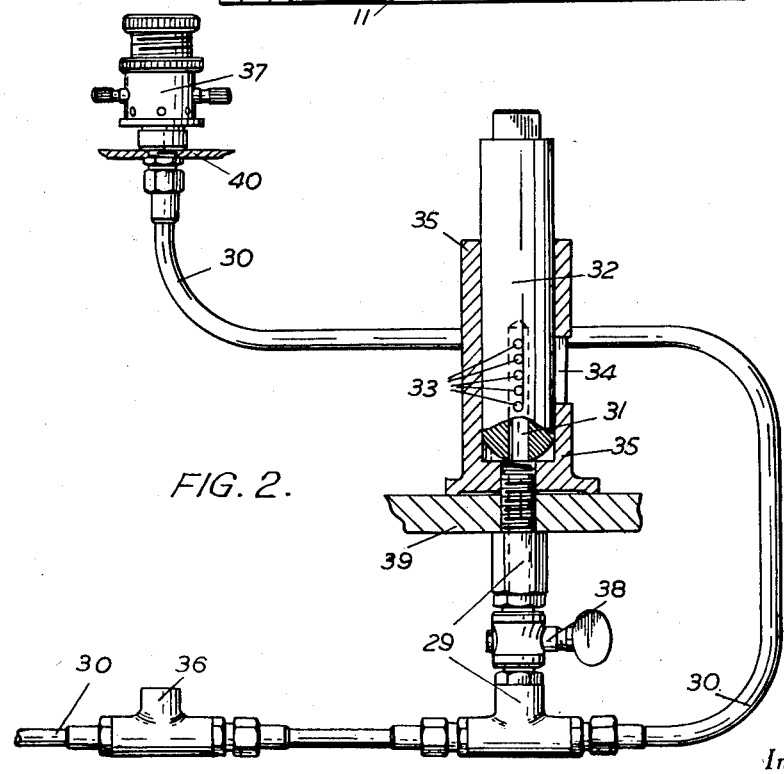
Figure 2 is a part sectional elevation showing control mechanism.

A chuck is provided adapted to be secured on to a suitable driving spindle which will usually be disposed in a vertical position with the base 10 of the chuck screwed by means of internal screw threads 11 on to a head of the spindle. The base of the chuck is fastened to an upstanding spindle 12 on to which a guide or holder 13 for the chuck body 14 is fixed. The guide 13 carries a pair of semi-cylindrical cork-faced lead or similar insets, forming centrifugal weights 15, which are separated and located by pegs through flanges 17 on the guide 13. The chuck body 14 is approximately cylindrical and consists of a light metal shell with a bronze or similar liner 18. It is spring loaded by a coil spring 19 bearing against a bottom flange 20 on the body 14 and the upper surface of the chuck base 10. The body 14 has an outwardly projecting flange 21 near the bottom and slightly above the flange it carries an outwardly projecting flexible lip or ring 22. There is a disc or cap 23 on the upper end of the chuck spindle secured by a screw 24. A vacuum passage 25 up the chuck spindle communicates with ducts 26 through the body guide engaging above the body. The chuck is intended for use in connection with workpieces of tapering or bell-like form. A suitably shaped cup is indicated in dotted lines at C, Figure 1. The cup or other article is fitted on to the chuck. The closed end of the cup seats on the disc or cap 23 at the top. The flexible lip or ring 22 bears against the inside wall of the cup and forms an air seal. The flange 21 on the body 14 also bears against the inside wall of the cup and serves to locate the cup correctly. By means of the spring-loading at the bottom, the body 14 is free to rise and fall on the body guide 13 but the latter is fixed to the spindle 11 by means of screws or pegs such as 27, and so the flange will adapt itself to variations (unavoidable in clay articles) in the internal diameters of the successive cups. Until this has been achieved the chuck has been rotating only slowly and the vacuum effect has been slight so as not to interfere with the placing of the cup on the chuck. At this stage, however, the speed of rotation of the chuck is accelerated so that a centrifugal action develops and the insets 15 in the body guide move outwards and grip the inside face of the body liner. This locates the body 14 positively; it is no longer free to rise and fall. Therefore no undue pressure can be exerted on the inside wall of the cup which would cause damage to it and the cup is now very firmly but gently held. The vacuum duct 25 through the chuck spindle communicates with a corresponding duct in the chuck driving spindle and this in turn communicates through a tube 30 and union 29 with a duct 31 in an element 32 operatively associated with the drive of the machine so that it is caused to make one complete revolution in each cycle of operation. While the chuck is rotating slowly one or more air bleeds 33 in this further duct are exposed to atmosphere through an opening 34 in a fixed shield 35. After the chuck has speeded up the rotation of the element 32 incorporating the said further duct 31 carries these air bleeds under the shield or cover 35 and closes them. The result is that the vacuum effect which is derived from a pump connection at 36 increases substantially to an extent governed by an adjustable leak valve 37 attached to the end of the tube 30. The air bleeds 33 become exposed again as the element 32 nears the end of its cycle. The added vacuum effect therefore ceases before the chuck speed is reduced. The tool operation on the cup is performed while it is rotating at full speed on the high vacuum. As the vacuum is reduced and the chuck speed slows down the cup is removed and a fresh one placed in position; a cock 38 controls the air flow through the union 29. This mechanism is carried by fixed parts 39, 40 of the frame of the machine.

In an alternative arrangement the initial position of the sliding body is determined by a fixed but adjustable collar on the spindle. It is so set that the sealing ring lightly contacts with the inside wall of the cup. As the vacuum increases the vacuum pull inside the cup draws the sealing ring and flange up into the tapering cup to make a positive location. Then the centrifugal action comes into effect and holds the ring and the flange in this position.

I claim:

1. A chuck for articles of the type having one end substantially closed and the opposite end open comprising a support for engaging the substantially closed end of the article, means engageable with the article adjacent the open end thereof to form an air seal within the article between said means and the substantially closed end of the article, further means mounting said air seal forming means for axial movement relative to the rotational axis of the chuck, and centrifugal acting means operatively connected with the air seal forming means serving to hold such air seal forming means in a fixed position on the article when the chuck is rotating at its working speed, and means to exhaust the air from said zone between the closed end of the article and the air seal forming means.

2. A chuck for articles of the type having one end substantially closed and the opposite end open comprising a rotatable spindle, a support carried by the free end of the spindle for engaging the substantially closed end of the article, a guide secured to the spindle for rotation therewith and having at least two recesses therein, a weight mounted in each recess, a body member surrounding said guide and weights, an annular flange on said body member engageable with the inner surface of the article adjacent the open end thereof, a flexible ring on the body member slightly above the annular flange and also engageable with the inner surface of the article, the flange and ring constituting means to form an air seal within the article between such means and the closed end of the article, means within the spindle and the guide to form a suction conduit leading to the interior of the article, means to exhaust air from the interior of the article through such conduit, and spring means cooperating with said body to permit said member to move axially of the guide until the speed of rotation of the spindle is such that said weights hold the body member to the guide.

3. A chuck for articles of the type having one end substantially closed and the other end open comprising means for supporting the closed end of the article, further means in spaced relation to the first named means engageable with the inner surface of the article adjacent the open end thereof to provide an air seal between the open end of the article and the closed end thereof, said last named means being capable of axial movement relative to the first named means, means to remove air from the zone between the said means, and centrifugal acting means operatively connected with the air seal providing means to prevent axial movement of the air seal providing means when the chuck has reached a predetermined rotational speed.

References Cited in the file of this patent

UNITED STATES PATENTS

| | | |
|---|---|---|
| 2,481,094 | Edwards | Sept. 6, 1949 |
| 2,519,139 | Keeney | Aug. 15, 1950 |
| 2,529,331 | Ellis et al. | Nov. 7, 1950 |